(12) United States Patent
Ramadas et al.

(10) Patent No.: US 8,780,720 B2
(45) Date of Patent: Jul. 15, 2014

(54) RADIO ACCESS NETWORK LOAD AND CONDITION AWARE TRAFFIC SHAPING CONTROL

(75) Inventors: Krishna Ramadas, Cupertino, CA (US); Chico Jayanthan, San Ramon, CA (US)

(73) Assignee: Venturi IP LLC, New York, NY (US)

( * ) Notice: Subject to any disclaimer, the term of this patent is extended or adjusted under 35 U.S.C. 154(b) by 262 days.

(21) Appl. No.: 12/985,240

(22) Filed: Jan. 5, 2011

(65) Prior Publication Data
US 2011/0170412 A1    Jul. 14, 2011

Related U.S. Application Data

(60) Provisional application No. 61/293,972, filed on Jan. 11, 2010.

(51) Int. Cl.
*H04L 12/26* (2006.01)
(52) U.S. Cl.
USPC .......................................................... 370/235
(58) Field of Classification Search
None
See application file for complete search history.

(56) References Cited

U.S. PATENT DOCUMENTS

| | | | |
|---|---|---|---|
| 7,072,336 | B2 | 7/2006 | Barany et al. |
| 7,466,652 | B2 | 12/2008 | Lau et al. |
| 2003/0530803 | | 8/2003 | Siegell et al. |
| 2003/0189900 | A1 | 10/2003 | Barany et al. |
| 2004/0571673 | | 5/2004 | Sage |
| 2004/0120286 | A1* | 6/2004 | Schwarz .................... 370/331 |
| 2005/0041584 | A1 | 2/2005 | Lau |
| 2006/0114870 | A1* | 6/2006 | Buckley et al. ............ 370/338 |
| 2007/0041346 | A1* | 2/2007 | Bae et al. .................. 370/331 |
| 2007/0100981 | A1 | 5/2007 | Adamczyk et al. |
| 2008/0026752 | A1* | 1/2008 | Flore et al. ................ 455/435.2 |
| 2008/0162637 | A1 | 7/2008 | Adamczyk et al. |
| 2009/0190638 | A1 | 7/2009 | Meir et al. |
| 2009/0252134 | A1 | 10/2009 | Schlicht et al. |
| 2010/0002692 | A1 | 1/2010 | Bims |
| 2010/0142421 | A1 | 6/2010 | Schlicht et al. |

(Continued)

FOREIGN PATENT DOCUMENTS

| | | |
|---|---|---|
| CN | 1372740 | 10/2002 |
| CN | 1836169 | 9/2006 |

(Continued)

OTHER PUBLICATIONS

Agarwal, et al., "Performance of P2P Live Video Streaming Systems on a Controlled Test-bed", Mar. 2008, 10 pages.

(Continued)

*Primary Examiner* — Otis L Thompson, Jr.
(74) *Attorney, Agent, or Firm* — KPPB LLP

(57) ABSTRACT

Fine grained RAN aware traffic prioritization in spectrum constrained modern wireless networks which support differentiated service plans uses cell load metrics supplied to a Fine grained Traffic flow Prioritization Engine (FTPE) with and without the assistance from a client side collection module, Peer Agent (PA), at the mobile. Knowledge about a mobile's subscription plan is derived from a Subscription Profiles Repository (SPR). Dynamic control on traffic prioritization is applied through operator policy control engines, Policy and Charging Rules Function (PCRF) module. The FTPE works with flexible flow aggregation rules to simplify and scale prioritizing, blocking, and deferring decisions. The FPTE may apply Deep Packet Inspection (DPI) techniques to identify application flows, and uses hierarchical queue disciplines to achieve the necessary flow control. The FPTE may also instead use an adjunct DPI to perform the flow identifications.

31 Claims, 13 Drawing Sheets

(56) References Cited

U.S. PATENT DOCUMENTS

| | | | |
|---|---|---|---|
| 2010/0142445 A1 | 6/2010 | Schlicht et al. | |
| 2010/0142446 A1 | 6/2010 | Schlicht et al. | |
| 2010/0142447 A1 | 6/2010 | Schlicht et al. | |
| 2010/0142448 A1 | 6/2010 | Schlicht et al. | |
| 2010/0150120 A1 | 6/2010 | Schlicht et al. | |
| 2010/0191604 A1 | 7/2010 | Raleigh | |
| 2010/0191612 A1 | 7/2010 | Raleigh | |
| 2010/0191847 A1 | 7/2010 | Raleigh | |
| 2010/0192170 A1 | 7/2010 | Raleigh | |
| 2010/0192207 A1 | 7/2010 | Raleigh | |
| 2010/0192212 A1 | 7/2010 | Raleigh | |
| 2010/0195503 A1 | 8/2010 | Raleigh | |
| 2010/0214943 A1* | 8/2010 | Immendorf et al. | 370/252 |
| 2010/0238803 A1* | 9/2010 | Racz et al. | 370/235 |
| 2010/0265919 A1* | 10/2010 | Ma et al. | 370/332 |
| 2010/0278042 A1* | 11/2010 | Monnes et al. | 370/230 |

FOREIGN PATENT DOCUMENTS

| | | |
|---|---|---|
| CN | 1985477 | 6/2007 |
| EP | 1290820 B1 | 11/2005 |
| WO | WO01/39029 | 5/2001 |
| WO | WO01/93486 A3 | 12/2001 |
| WO | WO2005/017707 A3 | 2/2005 |
| WO | WO2009/146132 | 12/2009 |
| WO | WO2010/028278 | 3/2010 |
| WO | WO2010/088073 | 8/2010 |
| WO | WO2010/088074 | 8/2010 |
| WO | WO2010/088075 | 8/2010 |
| WO | WO2010/088080 | 8/2010 |
| WO | WO2010/088081 | 8/2010 |
| WO | WO2010/088082 | 8/2010 |
| WO | WO2010/088083 | 8/2010 |
| WO | WO2010/088086 | 8/2010 |
| WO | WO2010/088087 | 8/2010 |
| WO | WO2010/088094 | 8/2010 |
| WO | WO2010/088096 | 8/2010 |
| WO | WO2010/088097 | 8/2010 |
| WO | WO2010/088098 | 8/2010 |
| WO | WO2010/088100 | 8/2010 |
| WO | WO2010/088101 | 8/2010 |
| WO | WO2010/088295 | 8/2010 |

OTHER PUBLICATIONS

Balasubramanian, et al., "QoS in Cellular Networks", retrieved online from url http://www.cse.wustl.edu/~jain, Washington University in St. Louis, Apr. 20, 2006, 24 pages.

Boringer, et al., "A QoS-aware multicast routing protocol for wireless access networks", IEEE Conference on Next Generation Internet Networks Design and Engineering for Heterogeneity, Trondheim, Norway, May 21-23, 2007, pp. 119-126.

Chen, et al., "A QoS Architecture for Future Wireless IP Networks", Twelfth IASTED Int'l Conf. on Parallel and Distributed Computing and Systems, Nov. 2000, pp. 1-10.

Choi, et al., "Scalable QoS Guaranteed Communication Services for Real-Time Applications", Texas, in the Proceedings of the IEEE International Conference on Distributed Computing Systems (ICDCS), Apr. 2000, 8 pages.

De Vasconcellos, et al., "Using Differentiated Services in 3G Cellular Networks", undated, 8 pages.

Heithecker, et al., "Traffic Shaping for an FPGA based SDRAM Controller with Complex QoS Requirements", ACM DAC 2005, Anaheim, California, Jun. 13-17, 2005, pp. 575-578.

Reisslein, et al., "Guaranteeing Statistical QoS to Regulated Traffic: The Multiple Node Case", Proc. of the 37$^{th}$ IEEE Conf. on Decision and Control, Dec. 1998, vol. 1, 8 pages.

Rodriguez, Alfonso, "Building Scalable and Adaptive Network Services", Dissertation in the Dept. of Computer Science, Duke University, 2003, 198 pages.

Toenjes, et al., "Flow-Control for Multi-Access Systems", Herzogenrath, Germany, Proc. IEEE Int'l Symposium on Personal, Indoor and Mobile Radio Communications (PIMRC), vol. 2, Sep. 2002, 5 pages.

Wu, Dapeng, "QoS Provisioning in Wireless Networks", Wireless Communications and Mobile Computing, vol. 4, Issue 8, Dec. 2005, 29 pages.

European Telecommunications Standards Institute (ETSI) 3rd Generation Partnership Project (3GPP), "Policy and Charging Control Architecture", 3GPP TS 23.203 V9.3.0 (Jan. 2010), retrieved from http://www.etsi.org/deliver/etsi_ts/123200_123299/123203/09.03.00_60/ts_123203v090300p.pdf.

European Telecommunications Standards Institute (ETSI) 3rd Generation Partnership Project (3GPP), "Policy and Charging Control over Gx Reference Point", 3GPP TS 29.212 V9.1.0 (Jan. 2010), retrieved from http://www.etsi.org/deliver/etsi_ts/129200_129299/129212/09.01.00_60/ts_129212v090100p.pdf.

European Telecommunications Standards Institute (ETSI) 3rd Generation Partnership Project (3GPP), "Telecommunication Management; Charging Management; Diameter Charging Applications", 3GPP TS 32.299 V8.9.0.(Jan. 2010), retrieved from http://www.etsi.org/deliver/etsi_ts/132200_132299/132299/08.09.00_60/ts_132299v080900p.pdf.

European Telecommunications Standards Institute (ETSI) 3rd Generation Partnership Project (3GPP), "UTRAN lu interface Radio Access Network Application Part (RANAP) Signalling", 3GPP TS 25.413 V8.4.0, (Oct. 2009), retrieved from http://www.etsi.org/deliver/etsi_ts/125400_125499/125413/08.04.00_60/ts_125413v080400p.pdf.

* cited by examiner

RADIO ACCESS NETWORK LOAD AND CONDITION AWARE TRAFFIC SHAPING CONTROL

CROSS REFERENCE TO RELATED APPLICATIONS

This application claims priority to U.S. provisional patent application Ser. No. 61/293,972, filed Jan. 11, 2010, the entirety of which is incorporated herein by this reference thereto.

BACKGROUND OF THE INVENTION

1. Technical Field

The invention is related to electronic networks. More particularly, the invention is related to radio access network load and condition aware traffic shaping control.

2. Description of the Background Art

Next-generation wireless networks are designed to provide quality-of-service (QoS) guarantees such as delay and data rate. Such designs support both deterministic and statistical guarantees. Operators have preferred statistical guarantees over the more severely conservative deterministic guarantees. Statistical guarantees support better revenue models for service offerings with limited and expensive wireless spectrum resources. A wireless scheduler with QoS guarantee differs from a wired scheduler because of the dependency of the former on the channel state of an end user. A wireless scheduler has to make use of asynchronous channel variations and multiuser diversity to implement QoS guarantees.

In addition to offering statistical QoS-assured services, operators also recognize the need for offering adaptive and best-effort services. Many web applications may not need strict statistical assurance. Some of these applications work reasonably well if their flow is adapted during QoS fluctuations and inter-cell hand-offs. Most of the other web applications perform well with best-effort services, bearing the burden of retrying lost transactions at the application level instead of relying on flow adaptation inside the operator network. A larger number of best-effort flows can be supported by resource limited wireless networks as compared to flows depending on network adaptation. The numbers of QoS-assured flows are even fewer than adaptive flows.

Wireless service providers have relied on provisioning their radio access network (RAN) resources and then relying on admission control policies to keep excess traffic off of the network. This has worked for circuit switched wireless phone services, and has also worked to a reasonable degree in the early phases of data wireless services on wireless networks.

Today, wireless service providers are realizing the limitations of reliance on admission control policies to keep out excess traffic load because such schemes more severely constrain revenue growth opportunity. Service providers often need premium-priced wireless subscription plans in addition to a larger number of non-premium subscribers. Such conflicting needs can be met only by attending to bandwidth hogging applications and keeping them from freely stealing resources from premium-priced traffic.

Rapid adoption of smart phones together with the growing numbers of web applications creates a need for an intelligent traffic control system to manage the unpredictable traffic mix. Such intelligence should reside outside the context of a standard wireless scheduler at the uU (or air) interface. An intelligent traffic control system identifies flows by the type of web applications to apply relative controls, taking into consideration such aspects as the current demands on RAN resources and the current fluctuations in RF links characteristics, such as cell loading and radio interference.

Priority based throttling is a concept that is well understood in wire line networks. Organizations usually need a way to let their high-priority traffic go ahead of their low-priority traffic when there is too much traffic entering their Wide Area Network (WAN) links. Layer Seven (L7) Rate Shaping techniques have been used for fine-grained bandwidth control to handle traffic spikes in wire line networks better. L7 techniques work well on wire line architectures, where the bandwidth to be shared among the competing traffic is steady. Solutions offered by L7 traffic shapers are applied on enterprise WAN access, CDNs and last mile Internet access points. They fall short of the needs in a next generation wireless access network.

Fine grained traffic control needs on a wireless access network are:

a) Recognizing the level of cell loading/congestion at a mobile user location;
b) Satisfying the bandwidth needs of higher priority and/or premium-priced application flow;
c) Lowering competition for bandwidth from lower priority and traffic; and
d) Letting low priority flow use bandwidth not needed by premium-priced flows.

It is also necessary to consider the operator's business decision policies. Operator policies may need to address such considerations as subscription plans, peak and non-peak hour traffic, subscriber preferences, characteristics and limitations of a mobile device.

Throttling or shaping traffic can reduce the negative impact of bandwidth-hungry applications, such as P2P, on RAN resources. These are essential, especially, during busy hours and in heavily congested cell sites. Following pre-defined policies and rules for Internet usage to limit certain type of traffic is necessary to implement differentiated service plans with different price points successfully. The effectiveness of pre-defined policies can be increased by including RAN awareness in policy triggers. For instance, premium-priced gaming services can experience smoother transit in congested cells through lowered competition from low priority traffic. Understanding what packets pertain to which data streams is critical for intelligent billing systems that are the backbone of customer-, service-, and application-based pricing packages. For instance, if customers buy and download a large video from a service provider's online shop, they might reasonably assume that the traffic is excluded from their fair usage allowance.

The standards (3GPP, 3GPP2) have specified four bearer classes of traffic, i.e. conversational, streaming, interactive, and background. There is a need to map finer level granularity IP side flows dynamically onto just these four classes on the RAN. There is a need to prioritize, block, and defer finer granularity flows either before they enter congested RAN backhaul links or busy cell sites. Therefore, it is desirable also to take these decisions based upon wireless user identity. In the case, for example, where:

(a) The system guarantees the associated QoS from the boundary of the RAN network out to the IP environment for a streaming application invoked from a mobile device; or
(b) The system guarantees the QoS from the service provider to the RAN boundary for push service.

The need to allow an operator to manage traffic growth and QoS in their network is well understood. 3GPP and other standards define the four main QoS classes discussed above as:

a) Conversational—voice/video;
b) Streaming—webinars/online classroom;
c) Interactive—browsing/file downloading; and
d) Background—email/DB updates.

Delay sensitivity is the main distinguishing characteristic of these QoS classes. However, application developers bury data deep inside packets, thus preventing simple classification and prioritization from being adequate. Today, operators must rely more on deep packet inspection (DPI) technology to classify and prioritize traffic. To keep up with the multiplying levels of data traffic, operators are also faced with the challenge of throttling bandwidth-hogging applications. Once a packet is classified, different policies are applied to the associated stream such as prioritization, rate limiting, and blocking. Operators deploy Policy Charging and Rules Functions (PCRF) to translate business decisions on to subscription plans.

Wireless access networks add a complexity dimension, namely RAN awareness, to decisions related to traffic shaping and QoS policies. For example, a more stringent policy may be necessary in a crowded RF cell than in a less crowded one. Similar policy differentiation could be applied based on a wireless base station profile. Base station profiles can, for example, can include fields to distinguish 2.5G, 3G, 4G RF links and backhaul bandwidth capacity limitations. Such profiles can enable an operator to enhance traffic flow management to throttle traffic from congesting limited RAN resources. For example, AT&T recently decided to block Slingbox traffic from iPhones on the AT&T 3G networks, indicating that this traffic would use large amounts of their 3G network's capacity. Also, rapid adoption of data cards, dongles, and netbooks is quickly opening the door for bandwidth-hogging peer-to-peer (P2P) traffic to migrate to wireless networks. Network operators will try to limit P2P traffic at least towards crowded cells to increase QoS for authentic subscriber traffic.

FIG. 1 is a schematic diagram that shows four base stations, each with different number of subscribers. Base station BS-A and BS-C are lightly crowded and probably located in less busy suburban location while base station BS-B is more likely located in a busy urban setting and is therefore most heavily crowded. Stringent throttling of bandwidth hogging applications may be called for in urban zones than in less busy suburban zones. In other words, a P2P application could operate without hindrance when operating in areas covered by BS-A and BS-C, while being required to be throttled when operating in areas covered by BS-B. Base station BS-D is moderately crowded and can operate better with some throttling of P2P applications, but to a lesser degree than in BS-B area. Crowding is likely to be less severe even in BS-B area during non-busy hours, thereby relaxing the need for throttling during those periods.

Thus, it would be advantageous to enable an operator to support a mission critical application competing for scarce RF resources in a crowded cell in the midst of long video downloads and bandwidth stealing P2P applications

SUMMARY OF THE INVENTION

In a press report in Q4'09, ATT confirmed that the carrier had trouble keeping up with its wireless data usage, resulting in dropped calls and long waits for users trying to run programs on their devices. A majority of troubles were attributed to the fact that 3% of users were consuming as high as 40% of network capacity. Consequently, ATT/Apple released a new kind of handset application with which a user can report trouble spots. Reports from various subscribers are to be rolled up to identify coverage areas that need improvement. RAN awareness based traffic shaping is an easier way of automating this type of activity. Anticipated poor performance can be prevented through RAN aware application policies by throttling bandwidth hogs before they have the chance to degrade other subscriber traffic. The introduction of new smart phone devices and applications has also been studied and was found to be clustered in certain dense metro area. Severe service degradations are often reported in these areas. RAN aware policies are also a definite solution in containing any negative impact to existing subscribers while upgrading network infrastructure to accommodate new/changing usage patterns fully. RAN aware policies can also provide more time for operators to study/model new traffic usage patterns modeled before embarking on expensive network infrastructure upgrades.

In an embodiment of the invention, RAN aware traffic shaping control is provided to enable an operator to support a mission critical application competing for scarce RF resources in a crowded cell in the midst of long video downloads and bandwidth stealing P2P applications. A presently preferred embodiment of a system for RAN aware traffic shaping consists of the following functionalities:

a) Cell/sector location awareness;
b) Measure location crowding factor;
c) Monitor delay sensitivity metric;
d) Base station profiles;
e) Interface to application/subscriber flow identification/classification; and
f) Interface to standard policy elements.

Cell location awareness, namely, cell ID is already used in voice calls to page User Equipment (UE). Mobile switching centers (MSC) and home location registers (HLR) track cell-ID/location information. Similarly, location information can be extracted from the radio network controller (RNC), Serving GPRS Support Node (SGSN), and General Packet Radio Service (GGSN) for wireless data subscribers as a mapping between the User Equipment's (UE) MSISDN and IP address.

An embodiment of the invention thus provides a method and apparatus for fine grained RAN aware traffic prioritization in spectrum constrained modern wireless networks which support differentiated service plans. Cell load metrics are supplied to a Fine grained Traffic flow Prioritization Engine (FTPE) with and without the assistance from a client side collection module, Peer Agent (PA), at the mobile. Knowledge about a mobile's subscription plan is derived from a Subscription Profiles Repository (SPR). Dynamic control on traffic prioritization is applied through operator policy control engines, Policy and Charging Rules Function (PCRF) module. The FTPE can work with flexible flow aggregation rules to simplify and scale prioritizing, blocking, and deferring decisions. In an embodiment of the invention, the FPTE may apply Deep Packet Inspection (DPI) techniques to identify application flows, and may use hierarchical queue disciplines to achieve the necessary flow control. The FPTE may also instead use an adjunct DPI to perform the flow identifications. RAN awareness may be brought to the FPTE from its peer agents (PA) on the mobile devices. RAN awareness can also be supplied from a Congestion Monitor (CM) inside the RAN cloud. A standard PCRF module can host policy-based rules based on time of day, network congestion, Base Station profile, and subscription plan.

BRIEF DESCRIPTION OF THE DRAWINGS

FIG. 9a shows a network in which available bandwidth on a lightly loaded cell must be prioritized across application flows; FIG. 9b shows a network in which cell sites often get congested; and FIG. 9c shows support for a network where TN links frequently get congested;

DETAILED DESCRIPTION OF THE INVENTION

Figure 1:
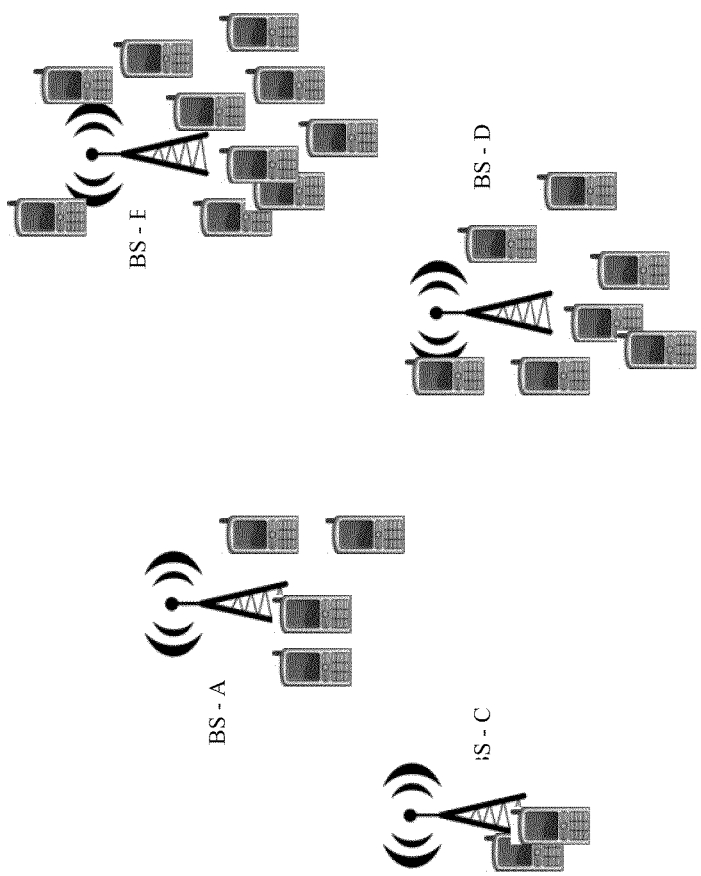
FIG. 1 is a schematic diagram that shows four base stations, each with different number of subscribers.
Figure 2:
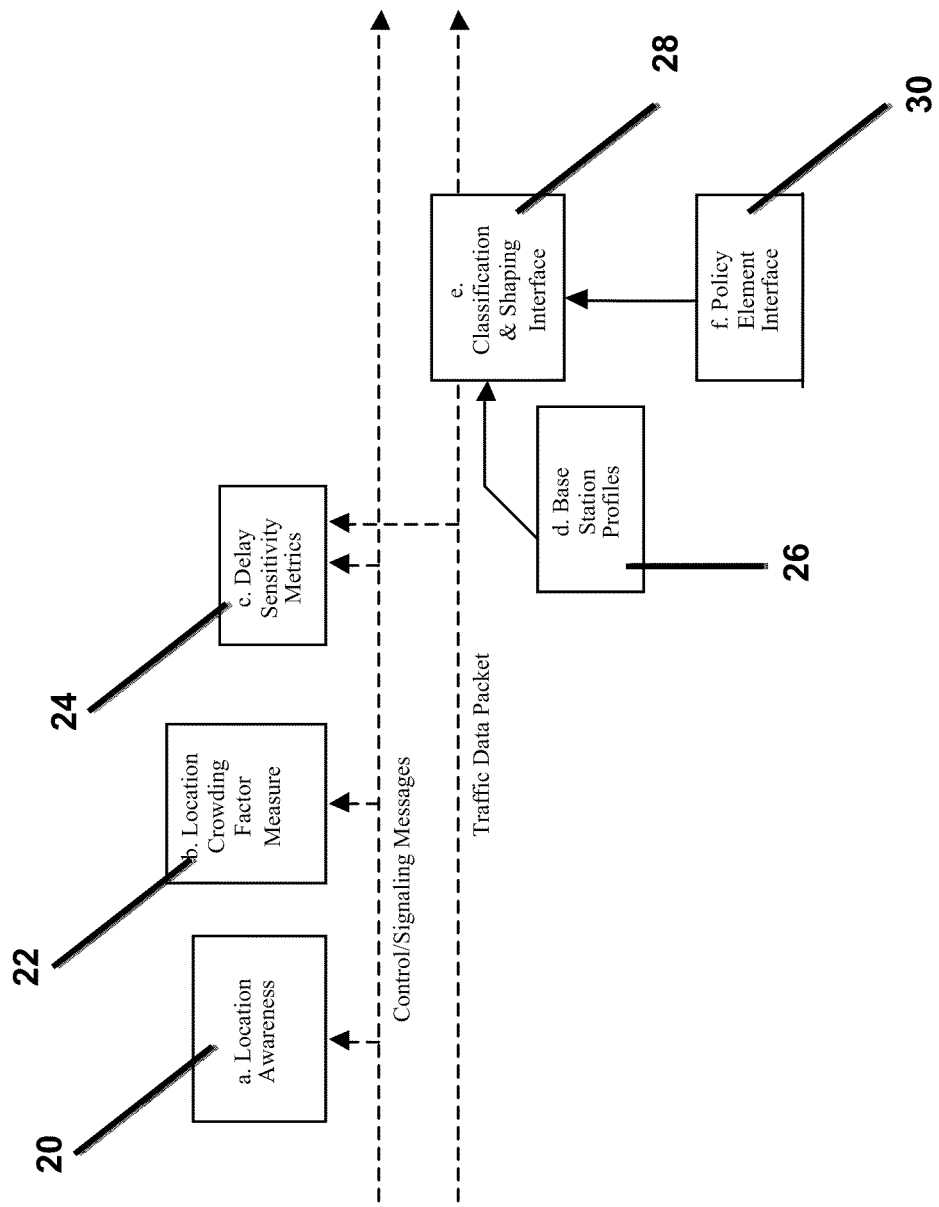
FIG. 2 is a block schematic diagram showing RAN aware traffic shaping control according to an embodiment of the invention.

FIG. 2 is a block schematic diagram showing an implementation of RAN aware traffic shaping control according to an embodiment of the invention. RAN aware traffic shaping control enables an operator to support a mission critical application competing for scarce RF resources in a crowded cell in the midst of long video downloads and bandwidth stealing P2P applications. A presently preferred embodiment of a system for RAN aware traffic shaping consists of the following functionalities:
a) Cell/sector location awareness 20;
b) Measure location crowding factor 22;
c) Monitor delay sensitivity metric 24;
d) Base station profiles 26;
e) Interface to application/subscriber flow identification/classification 28; and
f) Interface to standard policy elements 30.

Cell location awareness, namely, cell ID is already used in voice calls to page User Equipment (UE). MSC and HLR track cell-ID/location information. Similarly, location information can be extracted from RNC/SGSN/GGSN for wireless data subscribers as a mapping between the User Equipment's (UE) MSISDN and IP address.

Backhaul costs dominate the cost of offering wireless access. Operators uniformly provision backhaul bandwidth (2×T1/E1) on 2G/2.5G networks. However, 3G networks lack adequate backhaul upgrade because each base station may need as much as 6×T1/E1. Higher speed HSPA, namely, 14.4M can demand even larger numbers of T1/E1 links. For economic reasons, operators therefore upgrade only the busiest 3G cell tower locations with a sufficient number of T1/E1 links. Operators are also looking at more cost efficient backhaul alternatives, such as DSL and PseudoWire. Backhaul link differences in terms of capacity and technology will continue to exist in the future. Awareness of backhaul limits can help improve the quality of service through the use of policy based traffic management. Operator policies can steer congestion traffic away from weak backhauls to sustain the quality of service for higher revenue generating subscriber traffic.

Control messages between the RNC and the SGSN contain information about subscriber sessions. This is a good source for collecting cell/sector information. In FIG. 2, Cell/Sector location awareness 20 is shown to intercept control/signaling messages transparently for the purpose of constructing location awareness.

It is easy to count up/down the number of subscribers in an active sector/cell because Cell/Sector location awareness 20 is already tracking the location association. The Location crowding factor measure 22, i.e. the count of the number of connected subscribers in a cell/sector, can be used as a simple measure of crowding. Other more precise measures, such as RF interference, may also be used as a crowding measure.

Round trip times (RTT) are frequently used to measure two-way delay on links. RTT measurements can be captured either on data streams or on control/signaling streams as shown in FIG. 2, Delay sensitivity metrics 24. Periodic measurements can be maintained per base station to identify buffer congestion or other traffic abnormality on backhaul links to the base station.

Base Station Profiles 26 provide a way to distinguish the feature/capacity differences among different base stations in a hybrid RF network. Policy decisions based on capacity limits of base station equipment can be implemented by maintaining different profiles for 2G, 2.5G, 3G, 4G capable base stations. Unique profiles can also exist for different backhaul link capacities such as 2×T1, 8×T1, DSL, PseudoWire IP, etc. Base station profiles can also be imported from a pre-provisioned database maintained else where in an operator network.

RAN awareness can be packaged together with a built in Deep Packet Inspection (DPI) engine. The Classification and Shaping interface 28 module provides an interface for RAN awareness intelligence to interact with a third party DPI engine.

3GPP and other standards specify standard charging and rules interfaces to a GGSN/PDSN. The Policy element interface 30 can be an implementation of the interface (and any proprietary extensions) defined as Gx and Gy in the standards.

Figure 3:
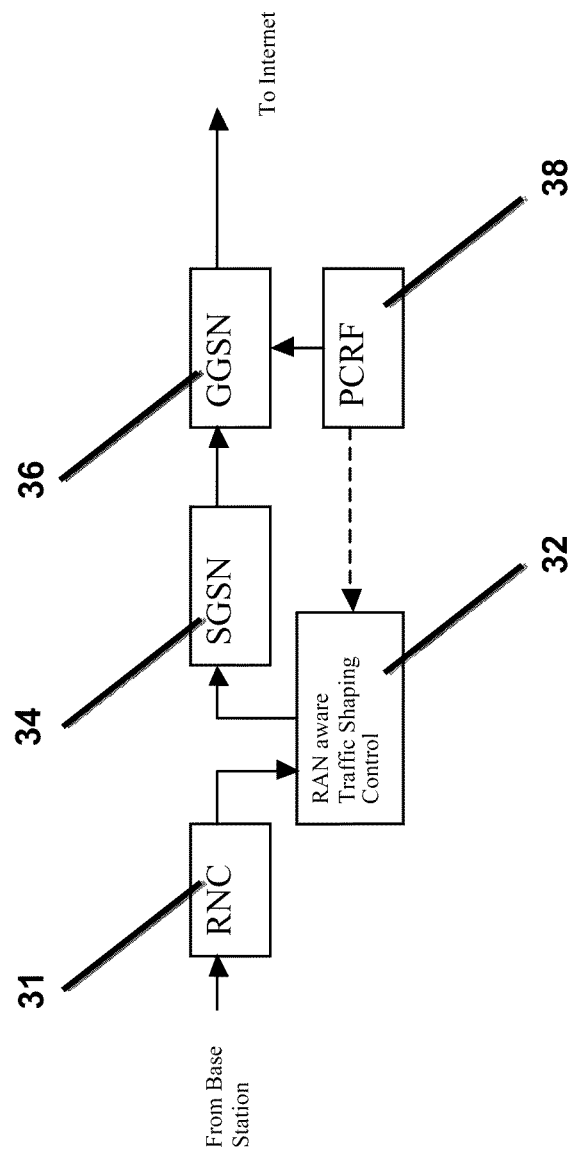
FIG. 3 is a block schematic diagram showing RAN aware traffic shaping control built with a DPI/shaper as a bump-in-the-line entity between an RNC and an SGSN according to an embodiment of the invention.

FIG. 3 is a block schematic diagram showing RAN aware traffic shaping control built with a DPI/shaper 32 as a bump-in-the-line entity between the RNC 31 and the SGSN 34. This location enables the RAN aware traffic shaper to extract cell/sector location awareness information easily from control messages between the RNC and a SGSN. This also enables the shaper to track crowding factor and delay metrics towards each of the cell/sectors hosted by an RNC. FIG. 3 also shows the interfaces to policy elements (PCRF) 38.

Figure 4:
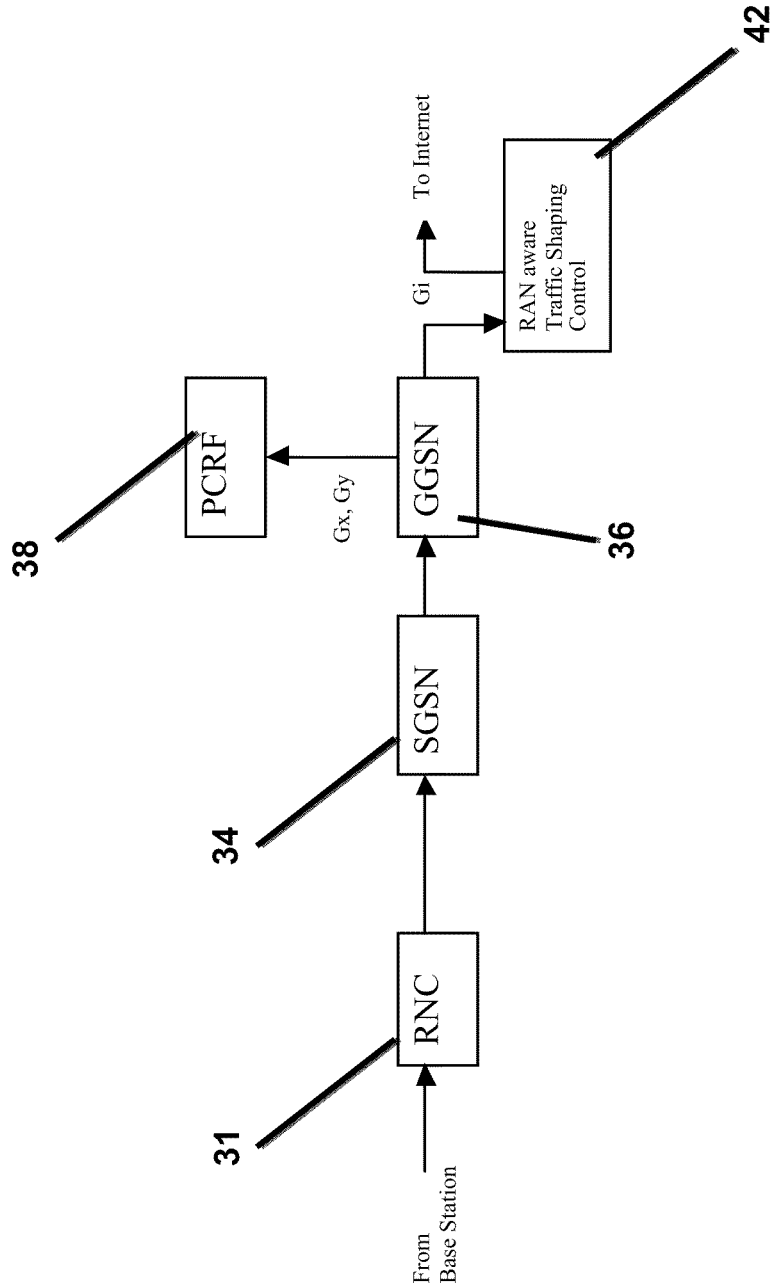
FIG. 4 is a block schematic diagram showing RAN aware traffic shaping control as a stand-alone facility next to a GGSN according to an embodiment of the invention.

Other likely locations for the shaper are:
a) As a stand-alone facility 42 next to the GGSN 36 (Gi interface), see FIG. 4; or
b) Integrated into a GGSN.

Figure 5:
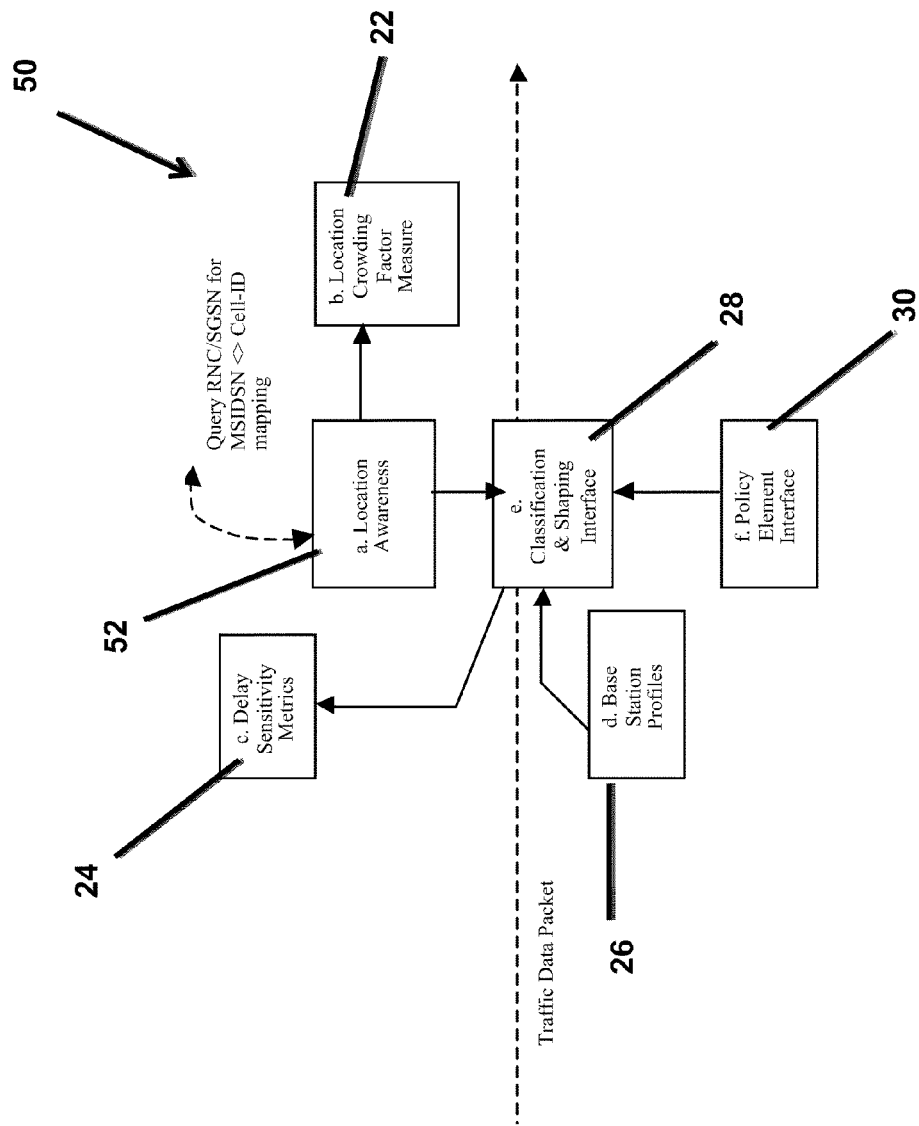
FIG. 5 is a block schematic diagram showing a RAN aware Traffic Shaping Control system implemented at a Gi interface according to an embodiment of the invention.

FIG. 5 shows an embodiment of a RAN aware Traffic Shaping Control system 50 when implemented at the Gi interface. This implementation does not rely on control/signaling traffic between the RNC and the SGSN for location awareness. Location awareness 52 is constructed by querying other entities, such as the RNC, SGSN, HLR, and MSC. In some embodiments, the UE itself can supply cell/sector information. In such a situation, the UE runs a special application to gather cell/sector information from the driver to respond to queries from RAN aware traffic shaping control module As discussed above, an embodiment of the invention is related to increasing the efficiency of data services using limited resources towards increasing the revenue generating capability of a modern wireless network infrastructure. The invention provides a method and apparatus for optimizing traffic while considering:

a) The nature of different web applications;
b) The existence of different wireless subscription plans;
c) Load conditions in a subscriber's present cell location;
d) Policy based traffic control; and
e) Existing admission control restrictions in wireless infrastructure.

Presently Preferred Embodiments

Figure 6:
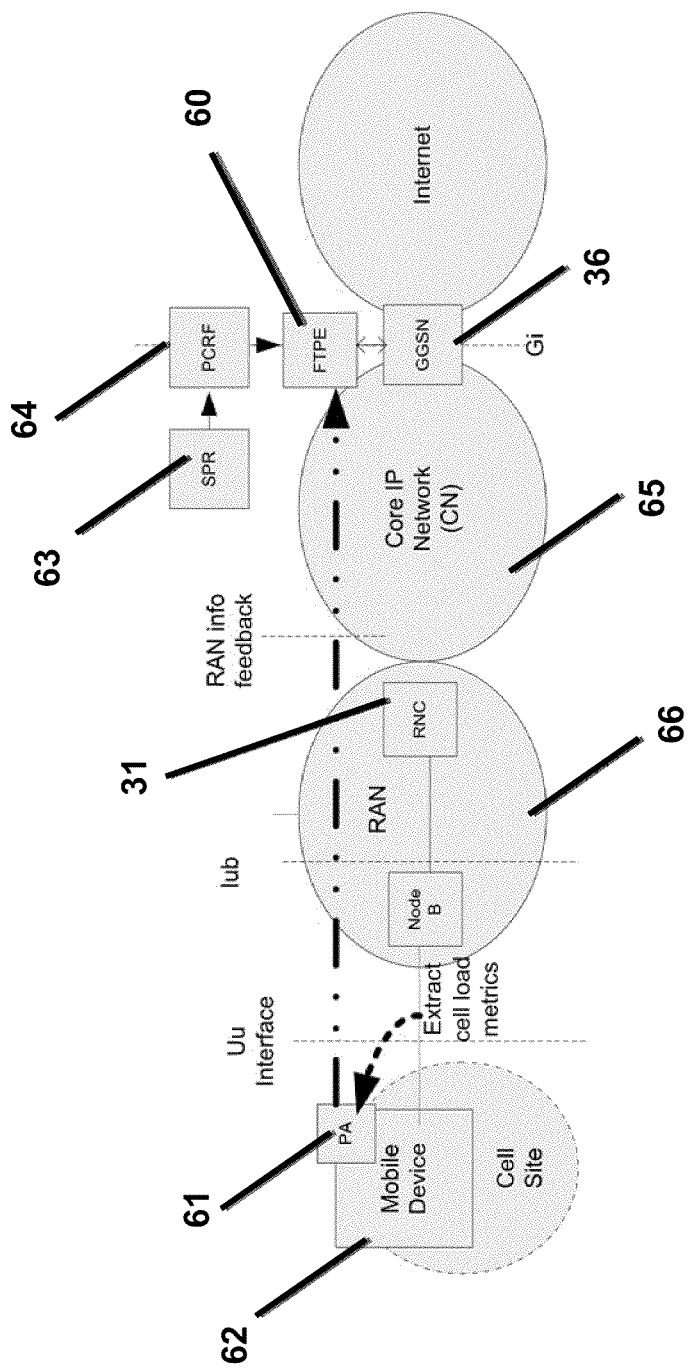
FIG. 6 is a block schematic diagram showing an embodiment of the invention that provides an FPTE at the entrance to the core IP network (CN) at the Gi interface.

FIG. 6 is a block schematic diagram showing an embodiment of the invention that provides fine grained RAN aware traffic prioritization in spectrum constrained modern wireless networks which support differentiated service plans. Cell load metrics are supplied to a Fine grained Traffic flow Prioritization Engine (FTPE) 60 with and without the assistance from a client side collection module, Peer Agent (PA) 61, at the mobile device 62. Knowledge about a mobile's subscription plan is derived from a Subscription Profiles Repository (SPR) 63. Dynamic control on traffic prioritization is applied through operator policy control engines, Policy and Charging Rules Function (PCRF) module 64. The FTPE can work with flexible flow aggregation rules to simplify and scale prioritizing, blocking, and deferring decisions.

In an embodiment of the invention, the FPTE may apply Deep Packet Inspection (DPI) techniques to identify application flows, and use hierarchical queue disciplines to achieve the necessary flow control. The FPTE may also instead use an adjunct DPI to perform flow identification. RAN awareness may be brought to the FPTE from its peer agents (PA) on the mobile devices. RAN awareness can also be supplied from a Congestion Monitor (CM) 70 (see FIG. 7) inside the RAN cloud 66. A standard PCRF module can host policy-based rules regarding based on time of day, network congestion, Base Station profile, and subscription plan.

Figure 7:
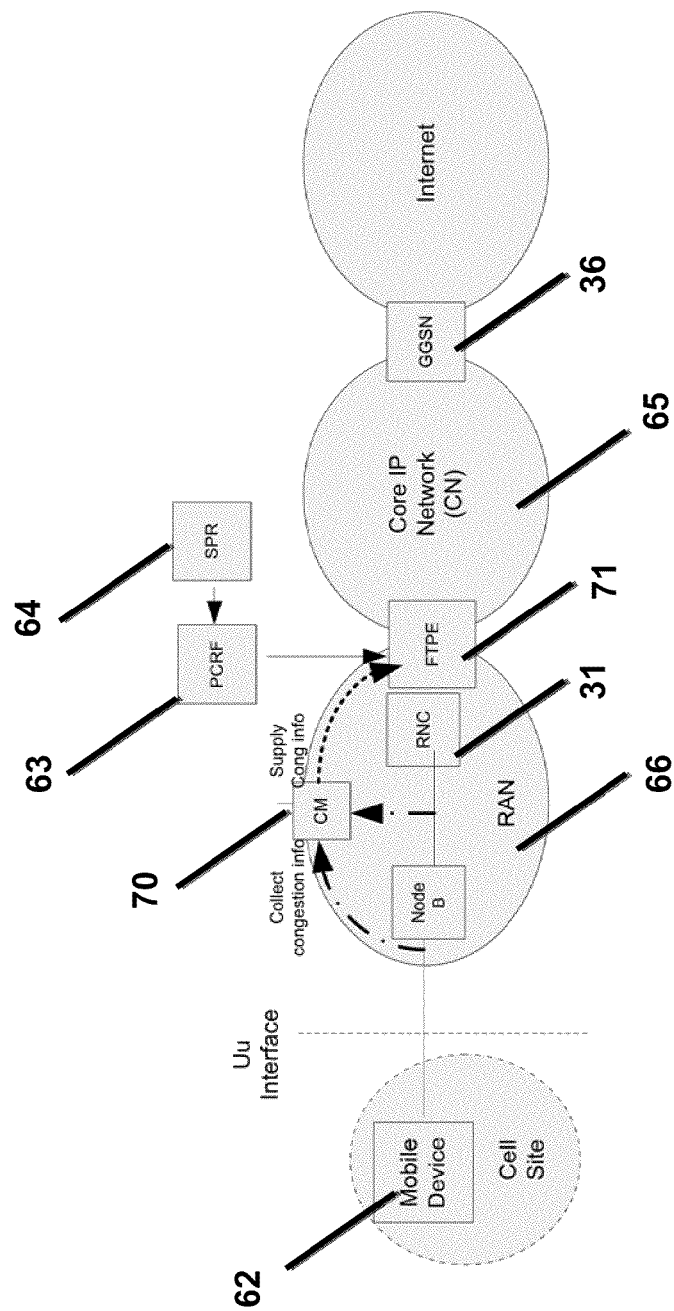
FIG. 7 is a block schematic diagram showing an embodiment of the invention that provides an FPTE that addresses RAN awareness as supplied from a Congestion Monitor (CM) inside the RAN cloud.

The FPTE may be applied either at the entrance to the core IP network (CN) 65, at the Gi interface, as shown in FIG. 6; or at the junction between the CN and the RAN cloud, as shown in FIG. 7. The FTPE can respond to congestion situations both inside the Transport Network Links (TNL), at the Iub interface, as well as on the RF links, at the Uu interface with the RAN, as shown in FIG. 6. In this case, the messages between the FPTE and the PA are the primary sources for RAN awareness. The FPTE can rely on both FPTE-PA messages, as well as information from the CM, for RAN awareness in the case shown in FIG. 7. Making the FPTE a part of the RAN also simplifies communication to and from CM modules in the RAN.

Figure 8:
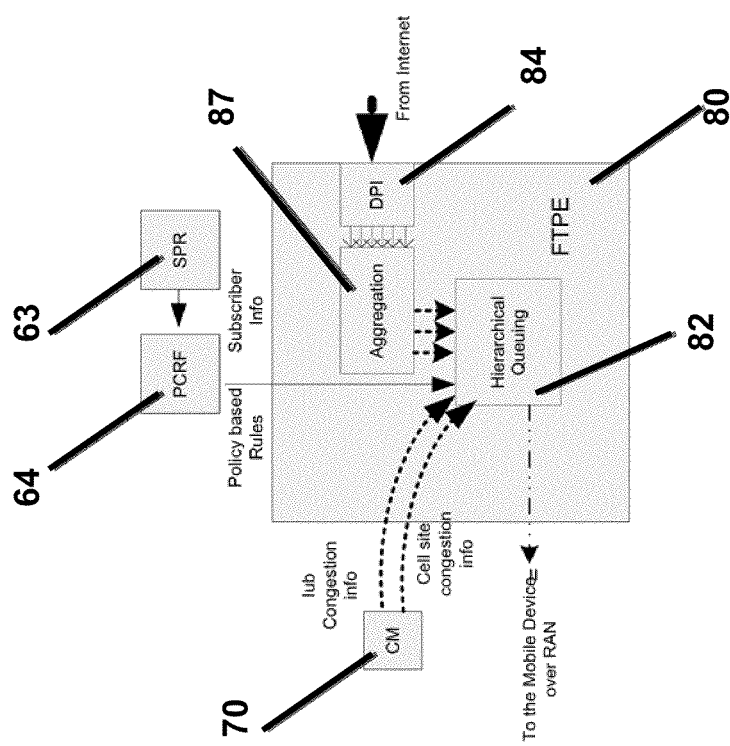
FIG. 8 is a block schematic diagram showing an FTPE that contains hierarchical queuing which handles aggregated flows according to art embodiment of the invention.

FIG. 8 is a block schematic diagram showing an embodiment of the FTPE that contains hierarchical queuing which handles aggregated flows. The aggregation module 81 of the FTPE 80 helps aggregate fine-grained flows into a smaller number of queue structures 82. A DPI 84 splits the traffic from the Internet into fine-grained flows based on:

a) The application;
b) The subscriber session; and/or
c) The destination cell sites.

Different queue configurations can simplify the management of queues and decrease the number of necessary queue structures to handle different network load scenarios.

Figure 9A:
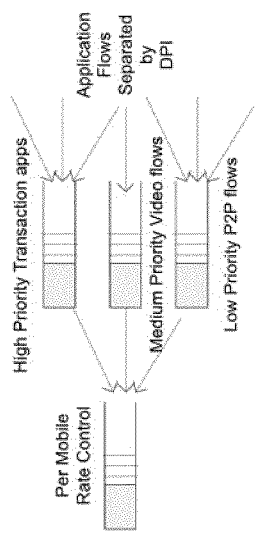
FIGS. 9a-9c are schematic diagrams that illustrate three sample scenarios, where
Figure 9B:
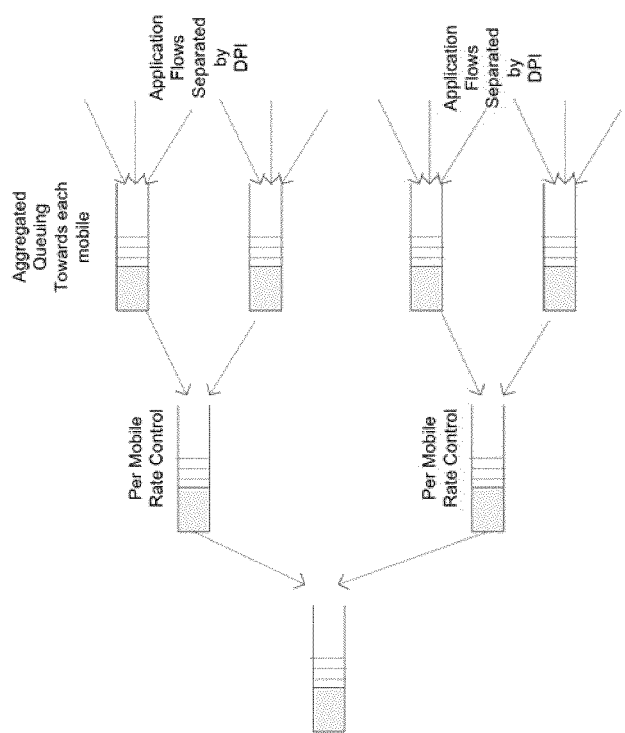
Figure 9C:
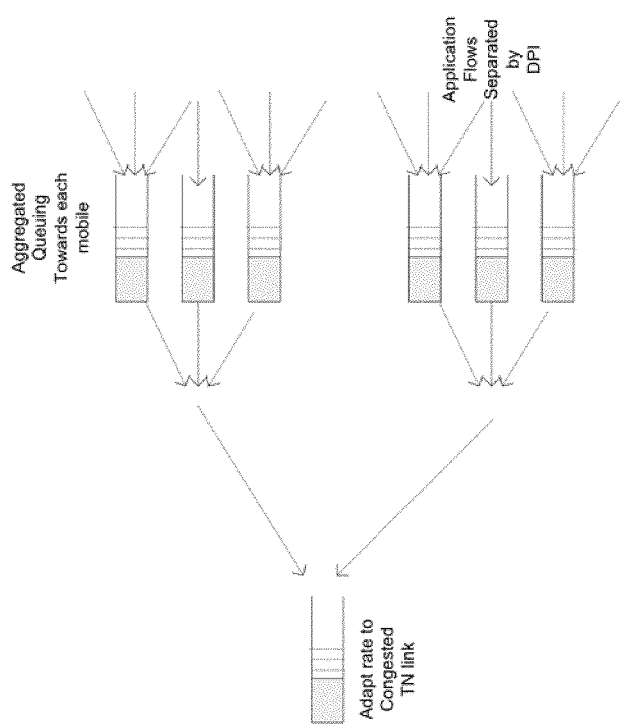

FIGS. 9a-9c are schematic diagrams that illustrate the three sample scenarios, where FIG. 9a shows a network in which the available bandwidth on a lightly loaded cell must be prioritized across application flows; FIG. 9b shows a network in which cell sites often get congested; and FIG. 9c shows support for a network in which TN links frequently get congested. The FPTE provides an easy way to alter queue hierarchies and to rotate limited queues structures among flows from different users.

Differences also exist between different RAN equipment, such as the Base Station (BS), NodeB, and RNC from multiple vendors. It is also possible that the Uu scheduler software is not the same on all NodeBs. Some adaptation of throttling characteristic may be necessary based upon these variations. The invention also enables a service provider to define policies and profiles for such variations to be considered in fine-grained throttling decisions on the FTPE.

Many popular applications on smart phone devices, such as the iPhone, are based on HTTP. HTTP has been traditionally treated as best effort traffic. The need to distinguish among HTTP based applications is based upon their differing capacity to use up available network bandwidth. Applications, such as P2P and YouTube videos, riding on top of the HTTP protocol can eat into the minimal bandwidth that is necessary for transaction oriented applications, thus slowing down transaction speeds to frustratingly low levels. On the other hand, a P2P flow can tolerate bandwidth deprivation because it is a totally background application. Aggregating application flows based upon the value of transactions is one way to control traffic, as shown in the FIG. 9a. When the user's radio conditions worsen, as reported by a message from a PA, the relative volume of traffic from applications can be skewed more towards transaction oriented ones.

The knowledge of the cell location of the users can be applied when aggregating flows (see FIG. 9b) in such a way that all higher valued HTTP transaction traffic is placed in one category, while lower valued traffic is placed in a second category. This scenario is illustrated in FIG. 9b. This configuration enables the Uu scheduler to allocate cell bandwidth efficiently across higher valued transaction traffic because the FPTE reduces the volume of lower valued traffic entering into the Uu scheduler. The knowledge of the congestion level of the cell can also be used to skew the volume of traffic towards higher valued HTTP transaction traffic.

Additional information about the load on TN links can be used to create an extra level of aggregation, whereby the aggregated flow is matched to the speed of the TN link to help alleviate the congestion on the TN link. At the same time, the scheme retains any skewing that is necessary due to the load in the cell site or due to poor coverage at the particular user's location within the cell site. This situation is illustrated in FIG. 9c.

The knowledge of daily and weekly usage patterns, i.e. information such as busy hours and low usage hours, can be used to customize the throttle levels on the fine grained and aggregated flows on the FTPE. Knowledge of mobile devices and their limitations can also be used to customize flows towards such devices so that excessive traffic is not clogging either the packet buffer memory space on the mobile waiting to be scheduled to be processed or the Uu scheduler queues due to slower RF circuitry on the mobile device. These controls are also possible with the configuration shown in FIG. 9b.

A peer agent (PA) can collect cell load condition using such metrics as:
a) SINR ratio as computed by the mobile's RF hardware;
b) Ratio of RF frame arrival rate to possible rate under low load conditions; and
c) Increasing/decreasing gap between arriving radio link frames within the same reception stream.

The PA agent can also extract congestion information from Radio Link Control (RLC) messages. Some related informational fields may be set by Uu scheduler at NodeB, which is in charge of the cell site in which the mobile is operating. The Uu scheduler works on queues towards each cell site and each mobile unit. It can therefore flag or set values in the RLC message representing the length of such queues. The PA agent can communicate these congestion metrics to the FTPE using:
a) Explicit message exchanges with the FTPE;
b) Piggyback such information on transport protocol headers, such as explicit congestion notification (ECN) flags, TCP option fields such as RUM; and
c) Piggyback such information in application protocol headers, such as HTTP header fields.

Figure 10:
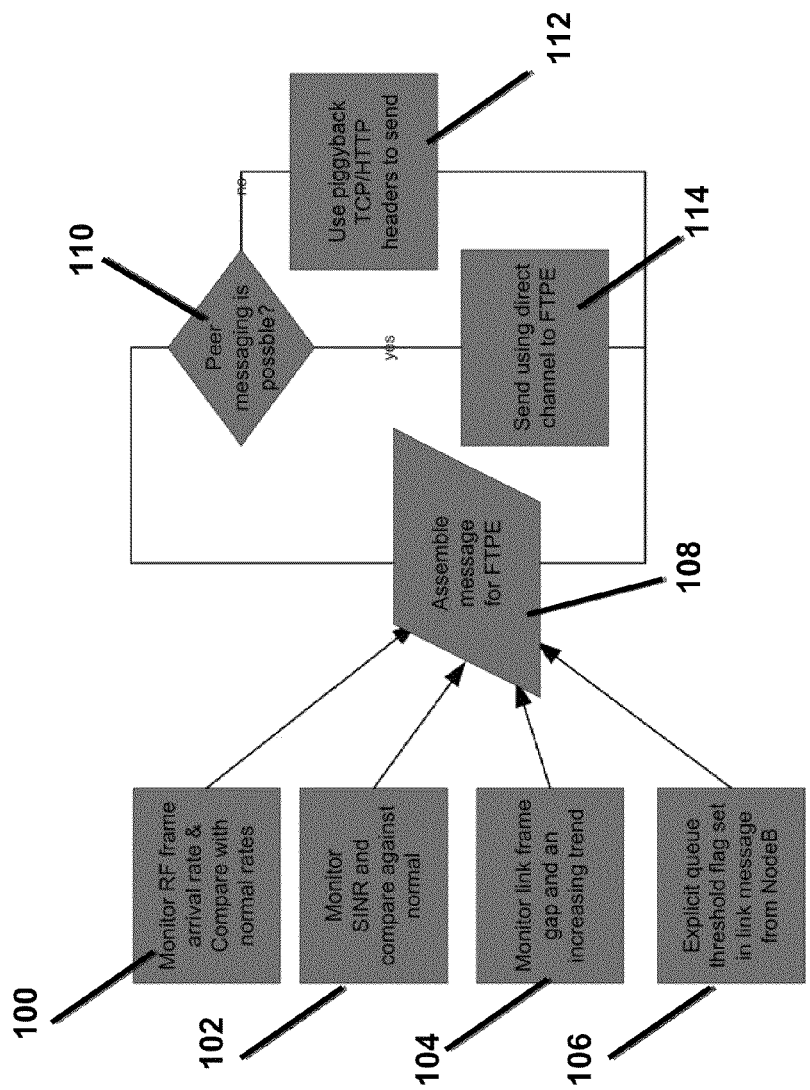
FIG. 10 is a flow diagram showing a sample set of metrics carried from the PA to the FTPE according to an embodiment of the invention.

FIG. 10 is a flow diagram showing a sample set of metrics carried from the PA to the FTPE. The FTPE would need to intercept congestion information silently if this information is sent using a piggyback mechanism. In FIG. 10, the RF frame arrival rate is monitored and compared with normal rates (100), the SINR is monitored and compared against normal SINR values (102), the link frame gap is monitored to identify an increasing trend (104), and an explicit queue threshold flag may be set in the link message from NodeB (106). All of these factors are used to assemble a message for the FTPE (108). If peer messaging is possible (110), the message is sent using a direct channel to the FTPE (104); else, piggyback TCP/HTTP headers are used to send the message to the FTPE (112). Table 1, below, shows PA metrics.

TABLE 1

PA Metrics

| | |
|---|---|
| Cell ID | 123 |
| SINR | 10 |
| Arrival Rate | 200 kbps |
| Frame Gap | 4 ms |
| Uu Q Threshold | 69% |

Figure 11:
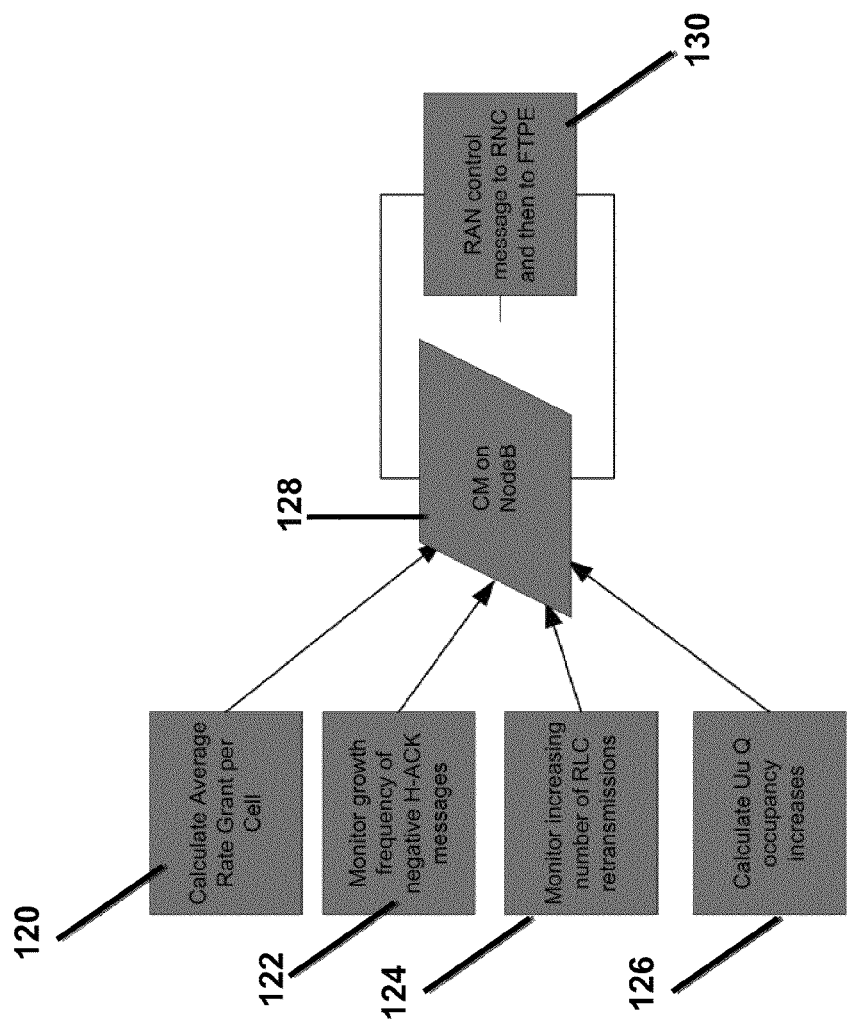
FIG. 11 is a flow diagram showing an embodiment in which a congestion monitor (CM) inside the RAN is implemented on NodeB or an RNC monitoring Uu resources according to an embodiment of the invention.

FIG. 11 is a flow diagram showing an embodiment in which a congestion monitor (CM) inside the RAN is implemented on a NodeB or an RNC monitoring Uu resources, such as:
a) Average rate grants to a cell/mobile (120);
b) Increasing frequency of link layer Hybrid ACKs (122);
c) Increasing instances of RLC retransmissions (124); and/or
d) Increasing queue occupancy in the Uu scheduler and the RNC scheduler (126).

The CM monitor on a NodeB must capture metrics at a cell unit and not at a mobile unit, and therefore does not demand heavy-duty CPU resources on NodeB. CM monitoring on the RNC must capture metrics towards each NodeB and can also capture information towards each cell (mac-hs scheduler) (128). Congestion tables can be assembled on the RNC containing rows as shown in Table 2 below, and can be made available to a collocated the FPTE (130). Control protocol messages between NodeB and the RNC can carry congestion reports from NodeB to the RNC.

TABLE 2

Congestion Table at the RNC

| Cell ID | TN link | Cell grants | RLC retx | Uu queue | PA feedback |
|---|---|---|---|---|---|
| 275 | normal | 1.5 mbps | 0.5% | 20% | 5 |
| 399 | c-high | 200 kbps | 15% | 25% | Not Available |
| 1522 | c-low | 500 kbps | 10% | 40% | 10 |
| 21 | normal | 1.3 mbps | 0.9% | 30% | 3 |

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for RAN aware traffic shaping control, comprising:
   a processor configured to receive a plurality of control/signaling messages and to determine cell/sector location awareness therefrom;
   said processor further configured to measure a location crowding factor based upon said control/signaling messages, said location crowding factor comprising a count of a number of connected subscribers in a cell/sector;
   said processor further configured to monitor a delay sensitivity metric based upon said control/signaling messages and also based upon a plurality of traffic data packets;
   a database configured to store a plurality of base station profiles, said base station profiles distinguishing feature/capacity differences among different base stations in a hybrid RF network utilizing a plurality of cellular communication standards;
   a classification and shaping interface in communication with said database, and configured to receive said traffic data packets and to perform application/subscriber flow identification/classification; and
   a policy element interface in communication with said classification and shaping interface and configured to access standard policy elements;
   said processor further configured to receive cell load metrics comprising a signal-to-interference-plus-noise ratio and a ratio of RF frame arrival rate to a predetermined possible RF frame rate under low load conditions; and
   said processor further configured to control traffic prioritization based on the location crowding factor, delay sensitivity metric, base station profiles, standard policy elements, and cell load metrics.

2. The apparatus of claim 1, wherein cell location awareness is determined from any of:
   a cell ID that is used in voice calls to page User Equipment (UE);
   a mobile switching center (MSC) and home location register (HLR); and
   a radio network controller (RNC), Serving GPRS Support Node (SGSN), and General Packet Radio Service (GGSN) for wireless data subscribers as a mapping between the User Equipment's (UE) MSISDN and IP address.

3. The apparatus of claim 1, wherein control messages between a radio network controller (RNC) and a Serving GPRS Support Node (SGSN) contain information about subscriber sessions that is used for collecting cell/sector information.

4. The apparatus of claim 1, wherein RF interference is used as a crowding measure.

5. The apparatus of claim 1, wherein Round trip times (RTT) are used to measure two-way delay on links, wherein said RTT measurements are captured either on data streams or on control/signaling streams.

6. The apparatus of claim 5, wherein periodic measurements are maintained per base station to identify buffer congestion or other traffic abnormality on backhaul links to a base station.

7. The apparatus of claim 1, wherein policy decisions are based on capacity limits of any of base station equipment and backhaul links by maintaining different profiles therefor in said database.

8. The apparatus of claim 1, further comprising:
a Deep Packet Inspection (DPI) engine, wherein said Classification and Shaping interface provides an interface for RAN awareness intelligence to interact with a third party DPI engine.

9. The apparatus of claim 1, wherein said RAN aware traffic shaping control is located between a radio network controller (RNC) and a Serving GPRS Support Node (SGSN); wherein said RAN aware traffic shaper extracts cell/sector location awareness information from control messages between the RNC and a SGSN; and wherein said RAN aware traffic shaping control tracks said crowding factor and delay metrics towards each cell/sector hosted by said RNC.

10. The apparatus of claim 1, wherein said RAN aware traffic shaping control comprises a stand-alone facility next to a General Packet Radio Service (GGSN).

11. The apparatus of claim 1, wherein said RAN aware traffic shaping control is integrated into a General Packet Radio Service (GGSN).

12. The apparatus of claim 1, wherein location awareness is constructed by querying any of a radio network controller (RNC), a Serving GPRS Support Node (SGSN), mobile switching center (MSC), home location register (HLR), and user equipment (UE).

13. The apparatus of claim 1, wherein said processor is further configured to:
determine whether peer messaging between the apparatus and a mobile device is available;
receive a message containing cell load metrics from the mobile device by a direct channel when peer messaging is available; and
receive a message containing cell load metrics piggybacked into a protocol header when peer messaging is not available.

14. A computer implemented method for fine-grained RAN aware traffic prioritization in spectrum constrained wireless networks that support differentiated service plans, comprising the steps of:
receiving cell load metrics from a client side collection module, Peer Agent (PA), in a mobile device, where the cell load metrics comprise a signal-to-interference-plus-noise ratio computed by RF hardware of the mobile device and a ratio of RF frame arrival rate to a predetermined possible RF frame rate under low load conditions;
supplying the cell load metrics to a processor configured for executing a Fine grained Traffic flow Prioritization Engine (FTPE);
said processor deriving knowledge about a mobile's subscription plan from a Subscription Profiles Repository (SPR); and
said processor applying dynamic control on traffic prioritization through an operator policy control engine, Policy and Charging Rules Function (PCRF) module, based on the received cell load metrics.

15. The method of claim 14, wherein said FTPE works with flexible flow aggregation rules to simplify and scale prioritizing, blocking, and deferring decisions.

16. The method of claim 14, further comprising the step of:
said FPTE applying Deep Packet Inspection (DPI) techniques to identify application flows, and using hierarchical queue disciplines to achieve necessary flow control.

17. The method of claim 14, further comprising the step of:
said FPTE using an adjunct Deep Packet Inspection (DPI) module to perform flow identification.

18. The method of claim 14, further comprising the step of:
supplying RAN awareness to said FPTE from its peer agents (PA) on mobile devices.

19. The method of claim 14, further comprising the step of:
supplying RAN awareness to said FPTE from a Congestion Monitor (CM) inside a RAN cloud.

20. The method of claim 14, further comprising the step of:
applying said FPTE either at an entrance to a core IP network (CN), at a Gi interface, or at a junction between said CN and a RAN cloud.

21. The method of claim 14, wherein messages between said FPTE and a PA comprise sources for RAN awareness.

22. The method of claim 14, wherein said FPTE relies on both FPTE-PA messages and information from a Congestion Monitor (CM) for RAN awareness.

23. The method of claim 14, further comprising the step of:
providing an aggregation module to aggregate fine-grained flows into a smaller number of queue structures.

24. The method of claim 14, further comprising the step of:
providing a Deep Packet Inspection (DPI) module to split Internet traffic into fine-grained flows based on any of an application, a subscriber session, and/or destination cell sites.

25. The method of claim 14, further comprising the step of:
providing a peer agent (PA) configured to collect cell load condition using metrics the comprises any of an SINR ratio as computed by a mobile's RF hardware, a ratio of RF frame arrival rate to possible rate under low load conditions, and an increasing/decreasing gap between arriving radio link frames within a same reception stream.

26. The method of claim 24, wherein said PA agent is configured to extract congestion information from Radio Link Control (RLC) messages.

27. The method of claim 24, wherein said PA agent is configured to communicate congestion metrics to said FTPE using any of explicit message exchanges with said FTPE, piggybacking information on transport protocol headers, and piggybacking information in application protocol headers.

28. The method of claim 14, further comprising assembling a metrics message for said FTPE by performing any of the steps of:
monitoring an RF frame arrival rate and comparing said RF frame arrival rate with normal rates;
monitoring an SINR value and comparing said monitored SINR value against normal SINR values;
monitoring a link frame gap to identify an increasing trend and setting an explicit queue threshold flag in a link message from NodeB.

29. The method of claim 28, wherein said message is sent using any of a direct channel to said FTPE and piggybacking TCP/HTTP headers.

30. The method of claim 14, further comprising the step of:
providing a congestion monitor (CM) inside a RAN for monitoring Uu resources, said Uu resources comprising any of average rate grants to a cell/mobile, increasing frequency of link layer Hybrid ACKs, increasing instances of RLC retransmissions, and/or increasing queue occupancy in a Uu scheduler and an RNC scheduler.

31. A non-transitive storage medium having stored thereon program instructions which, when executed by a processor, implement the method of claim 14.

\* \* \* \* \*